Patented Apr. 3, 1934

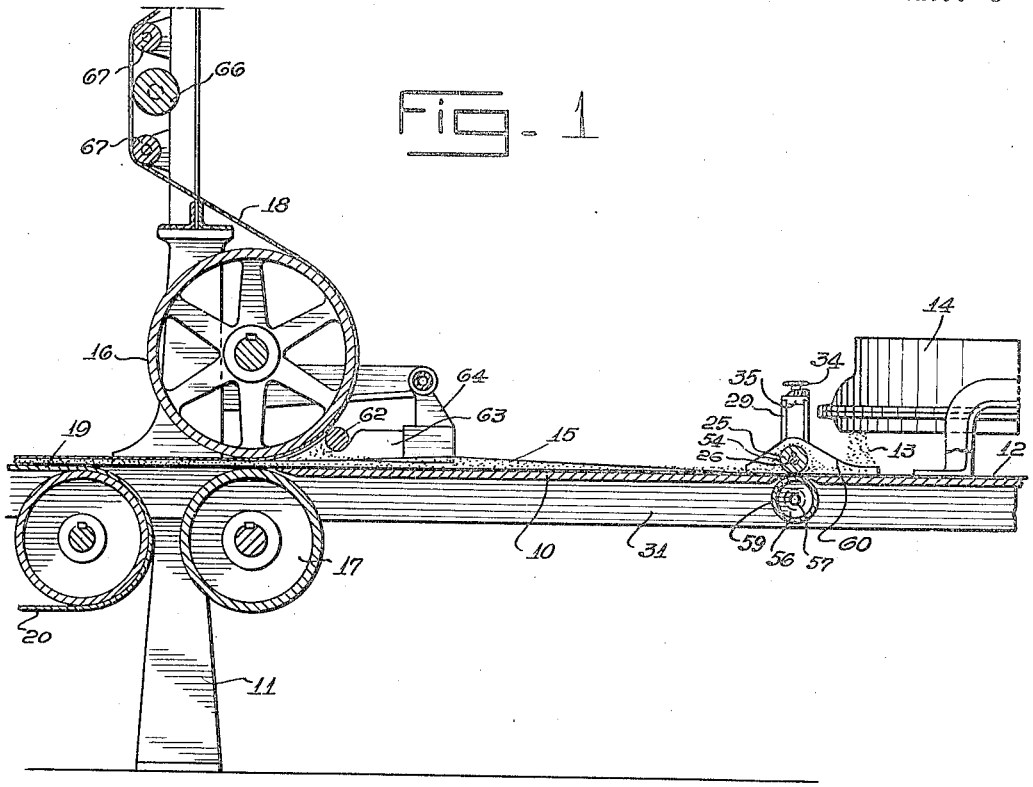
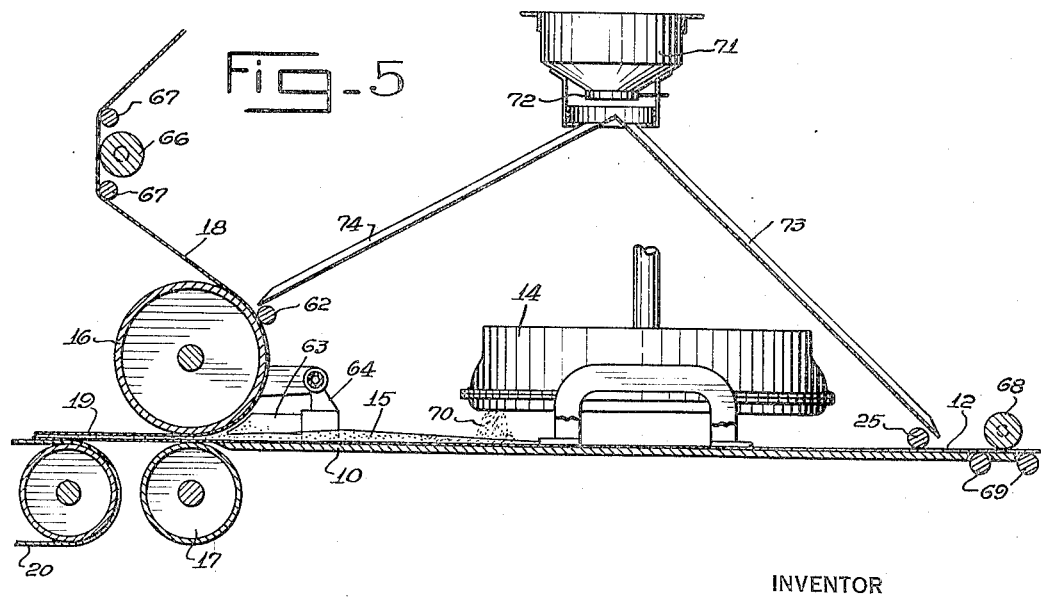

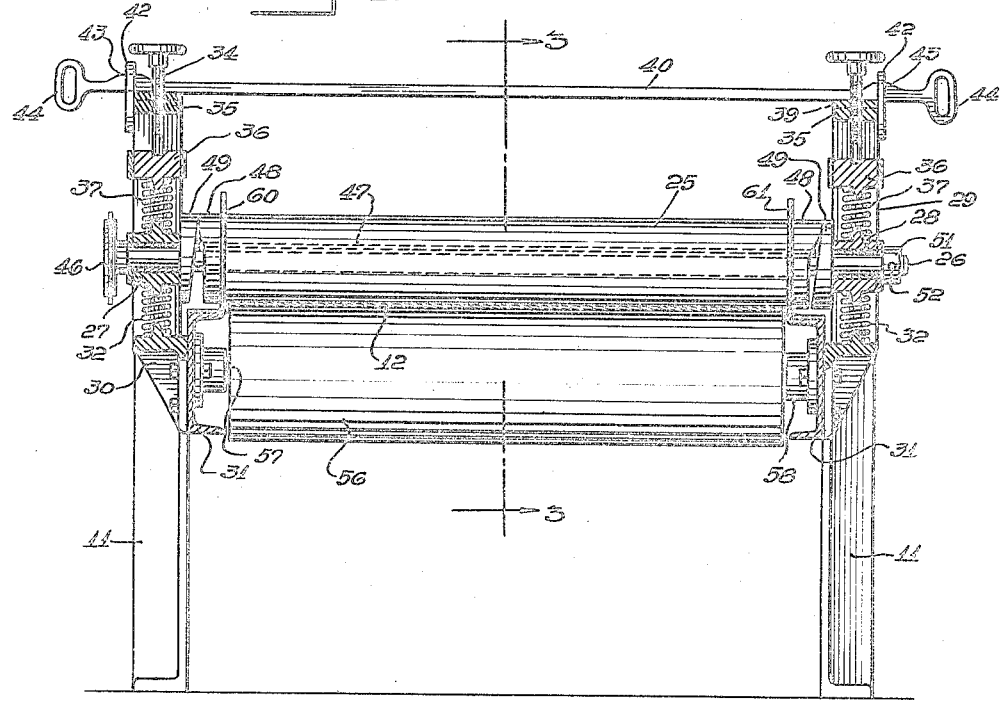
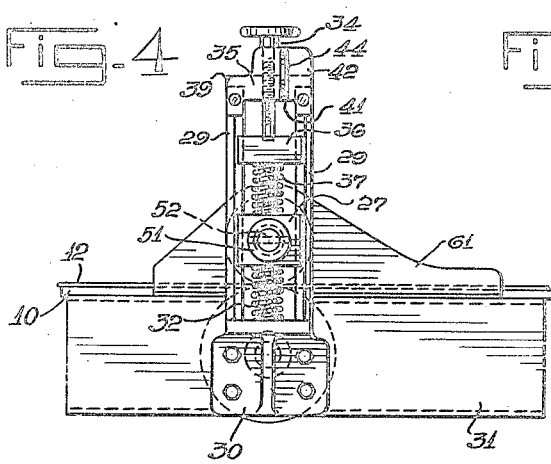
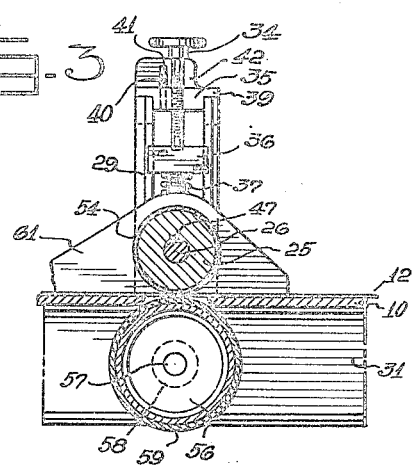

1,953,589

UNITED STATES PATENT OFFICE 1,953,589

UNITING DISSIMILAR MATERIALS

Thomas P. Camp, Glen Ellyn, Ill., assignor to United States Gypsum Company, Chicago, Ill., a corporation of Illinois Application January 13, 1932, Serial No. 586,373

26 Claims. (Cl. 154—1)

This invention relates to improvements in uniting dissimilar materials and to improved methods and means of effecting a bond between the same, and more particularly relates to the improved methods and means of attaining as nearly an indestructible cohesion between cementitious and fibrous materials as possible.

In the manufacture of articles which comprise a cementitious core and a fibrous covering or base, such as plaster wallboard or the like, the general procedure is to form the core on the cover or base sheet, or to apply the covering while the core is still in an entirely plastic state. However, there has been much difficulty encountered in getting a uniform bond or cohesion between the cementitious core and the covering material. Generally a felted fibrous sheet material such as paper is used as the base or covering material, and, particularly where the paper is highly sized and/or is highly calendered, the cementitious core material will frequently fail to properly adhere at the inter-face where the paper lies adjacent the core material. Furthermore, where the fibrous covering is considerably porous, it may absorb so much of the liquid medium from the cementitious material as to impair the bonding qualities of the inter-face. Where such conditions prevail great non-uniformity results in the finished product as the covering will be loose or will easily come loose and thus greatly weaken the product and reduce its usefulness. Various expedients have been employed to improve the bond between the cementitious core material and the covering. Among these may be mentioned the use of adhesive materials at the inter-face between the core and cover, the use of adhesive materials co-mingled with the cementitious material itself, the provision of various indentations or the forming of a mechanical bond by the formation of perforations in the covering, or by adhesively securing loose fibers to the inter-face surface of the cover. These expedients carry with them one or more of the objectionable features of added expense, weakness of the finished product, unsightliness, attractiveness for vermin, etc. On the other hand, the ideal conditions of such a product is that it be inexpensive, uniformly strong, free of peeling, attractive as to form, vermin-proof, etc.

It is, therefore, an object of the present invention to provide a product of a cementitious core material and a fibrous covering in which there is a strong, uniform bond between the components.

Another object of the invention is to provide a plaster wallboard in which the covering sheets are free from peeling.

A further object of the invention resides in the provision of means for treating the contact surface of a cover sheet so as to secure uniform cohesion of the cementitious material.

An additional object of the invention is to unite plastic materials with fibrous surfaces, without requiring the use of adhesive means other than the adhesive qualities of the plastic materials themselves, and to procure such union in a simple, neat, economical and thorough manner.

A still further object of the invention resides in the provision of improved methods of and means for effecting a secure bond between plastic materials and a fibrous surface; also to improve articles formed by uniting dissimilar materials and the methods and means for producing the same in other respects hereinafter specified and claimed.

Reference is to be had to the accompanying drawings forming a part of this specification, in which Fig. 1 is a sectional elevation of a simple plaster wallboard forming mechanism illustrating certain embodiments of the invention;

Fig. 2 is a sectional elevation of a suggested form of driven oscillating roller unit to be employed in carrying out certain steps involved in the invention;

Fig. 3 is a sectional elevation through the roller section taken on line 3—3 of Fig. 2;

Fig. 4 is an end elevation of the roller section; and

Fig. 5 is a more or less diagrammatic, sectional elevation of a modified combination of elements for carrying out various features of the invention.

In the manufacture of cementitious products having a cementitious body, such as plasterboard, there is generally provided a forming table 10 (Fig. 1) suitably supported as by standards 11. Cover sheet 12 of paper or the like is unwound from a roll and carried over table 10, receiving plastic cementitious material, such as a slurry of calcined gypsum, water, foam, etc. 13, from a mixer 14, passing between folders 15 which fold over the edges of the sheet, and then passing between the master roll 16 and head roll 17. Another strip or sheet of paper 18 passes down over the master roll 16 and forms the opposite cover of the board. The formed board 19 is then carried off by the setting conveyor 20.

I have discovered that the coherence of a cementitious material and a contacting surface is very much dependent on the depth to which the crystals of the cementitious materials penetrate into the surface. For example, in the manufacture of plasterboard, where the cover sheets may be rather closely felted, sized, and calendered in a variety of degrees to procure maximum strength per weight and area, and the gypsum is not enabled to penetrate the surface to any appreciable extent, much difficulty is generally encountered due to spottiness or peeling of the cover sheet from the core of the finished product because of failure of cohesion between the components, unless some such means, as heretofore mentioned, is employed to insure bonding. This is not, however, the only element of difficulty in board manufacture; for the formed board is customarily passed through dryers as quickly as practicable with a temperature as high as 350° F. in order to accelerate production. This step tends to remove the moisture in and adjacent the inter-face before it is removed from the other parts of the slab, whereby hydration and bonding of the plaster, which otherwise might still continue for some time, is stopped; and the rapid shrinking of the paper causes considerable tension on such cohesive connection as may be present. As a consequence, blisters will appear and the covering is subject to peeling. In furtherance of my discovery, I have found that where the crystals of the cementitious material are made to substantially penetrate the surface to which adherence of the cementitious material is desired, an exceptionally tenacious bonding is secured. In the case of a fibrous surface such as the paper covering of plasterboard, this phenomenon is undoubtedly enhanced by the intermeshing of the fibers of the surface by the crystalline net work formed upon setting of the gypsum. To illustrate these principles of my invention, I shall describe their application in the manufacture of the plasterboard, but such description is not to be construed as in any way limiting the scope of the invention.

In order to obtain the desired depth of crystal penetration of a cover sheet in the manufacture of plasterboard, I preferably provide an oscillating and rotating roll 25 in the path of sheet 12 carrying the stucco slurry 13. This roll 25 is mounted at any suitable point on the table 10 intermediate the mixer 14 and the master roll 16, by means of shaft 26 supported in journal blocks 27 having suitable bearings 28 and adapted to slide freely in the guide standards 29 which are supported by brackets 30 secured to the table frame member 31 on each side of table 10. The journal blocks 27 are supported on springs 32 which rest on the brackets 30 and tend to urge the blocks 27 upwardly, as a consequence of which the roll 25 is normally held out of contact with the sheet 12. In order to overcome the upward force of the springs 32 and bring the roll 25 into operative contact with the sheet 12, manually operated screws 34 threaded in head blocks 35 are provided to exert such pressure as desired upon the blocks 27 by depressing pressure blocks 36 and compressing springs 37. The head blocks 35 are not secured to the guide standards 29 but are provided with flanges 39 which rest on the tops of the standards and are securely held down against the standards by means of a lock bar 40 which is slidably engaged in slots 41 of plates 42 fastened to the tops of the guide standards 29. Locking cam lugs 43 on bar 40 engage against the upper edges of the slots 41 and during normal operation keep the flanges 39 of the head blocks 35 tightly against the top of the guide standards 29; but these lugs 43 are so constructed that, when it is desired to release the same from locking engagement, it is merely necessary to push or pull handles 44 formed on each end of lock bar 40 so as to throw the lugs out of locking engagement with the slots 41. When the lugs 43 are thrown out of locking engagement as described, the compressed springs 32 and 37 will vent some of their compression force to urge the blocks 35, in which the screws 34 are threaded, upwardly with the bar 40. Obviously, in this general upward movement, the journal blocks 27 will also be urged upwardly by the springs 32 and carry the roll 25 out of contact with the sheet 12. It is thus apparent that not only is the roll 25 adjustable relative to the pressure with which it engages the surface of the sheet 12, but it is also resiliently mounted and will give somewhat on passage of obstructions thereunder. Furthermore, in case the paper breaks or a splice is made or it should become necessary for any other reason to instantly release the pressure of the roll 25, such control is convenient, simple and instantaneous by merely pushing or pulling on the bar 40, and operation of the roll may be just as quickly resumed by an opposite push or pull on the bar 40 whereby the blocks 39, carrying the screws 34 are forced downwardly to depress the blocks 36 and compress the springs 37 which in turn press against the journal blocks 27 and again bring the roll 25 into operative contact with the sheet 12.

Power from any suitable source for driving the shaft 26, is transmitted through sprocket 46, and a feather key 47 keys the roller 25 for rotation with the shaft 26 but allows the roller to freely slide longitudinally of the shaft. The ends of the roll 25 are provided with cams 48 which ride against the oppositely beveled plates 49 secured to the journal blocks 27, so that as the roll is driven it will oscillate transversely of the sheet 12, the oscillations increasing in direct proportion to the speed of rotation of the roll. A retaining collar 51 is secured by means of pin 52 to the end of the shaft 26 opposite the end on which the sprocket 46 is fitted.

The roll 25 is preferably driven at a peripheral speed somewhat different from the rate of movement of the sheet 12, either more rapidly or more slowly, or it is rotated in opposition to the direction of movement of the sheet. By so driving the roll 25 there is a rubbing action longitudinally of the sheet as well as the transverse rubbing action imparted by the oscillations of the roll. The peripheral speed and direction of movement of the roll 25, however, is a matter which must be governed by the particular characteristics of the slurry employed and the type of cover being used, and I do not contemplate limiting myself in any respects whatsoever in this regard. The roll 25 may, for purposes of economy, comprise a core of inexpensive material and a friction casing 54 of suitable hard material or metal such as will withstand the constant friction against the sheet 12 during the functioning of the roll, such as bronze or high carbon steel. The surface of the roll 25 may be knurled, striated or otherwise roughened if and as desired to increase the scrubbing action of the roll upon the fibrous surface. A pressure roll 56 is preferably provided below the roll 25 to bear against the underside of the sheet 12. This roll is carried on trunnions 57 journaled in suitable bearings 58 secured to the frame members 31, and may be either freely rotating or driven as desired. Since the oscillations of the roll 25 naturally tend to urge the sheet 12 transversely, the roll 56 is preferably provided with a rubber covering 59 which will frictionally retard transverse motion in the sheet 12 as it passes between the rollers. The cementitious slurry 13 which tends to pile up and over the roll 25, is retained on the sheet by means of dams 60 and 61 on each side of the table 10, the dams being suitably apertured for the roll 25.

A roll 62 (Fig. 1) for rubbing the slurry into the sheet 18 is preferably provided in contact with the sheet adjacent the master roll 16 at a point where the roll 62 will revolve in the slurry piled up by the formative pressing operation of the rolls 16 and 17. The roll 62, similarly to the roll 25 is preferably oscillated transversely of the sheet 18 and rotated at a surface speed different from that of the sheet or in a contrary direction to the sheet. The dams 63, which are secured to the folder 15 and the lateral adjustment element 64 of the folder, retain the slurry within bounds and prevent the same from lapping over onto the folded over edges of the sheet 12. These dams 63 are suitably notched to receive the roll 62.

Although it may not ordinarily be necessary, however, where a highly sized and calendered paper is being used for either one or both of the cover sheets, it is desirable to open up the surface of the paper by roughening or abrasion before the slurry is rubbed into the surface. The means for effecting this opening of the surface of the sheet may comprise a sanding roll or wire brush 66 mounted between guide rolls 67. The rolls 67 allow for adjustment of the contact between the sheet and the roller or brush 66 to control the degree of abrasion as necessitated, for example, by variations in the finish of the paper or the type of slurry being used. The sanding roll, wire brush or like abrasive device 68 (Fig. 5) may be mounted on the table 10 for similarly operating upon the surface of the sheet 12. The rollers 69 may be either driven or idling, and may be rubber covered so as to frictionally restrain any tendency of the sheet to displace transversely of its path by reason of any urging of the abrader 68.

In one manner of carrying out the improved method of manufacturing cementitious slabs according to the principles of the present invention, and with apparatus such as described in connection with Figs. 1 through 4, the paper cover sheets 12 and 18 are constantly drawn between the rolls 16 and 17, and the slurry 13 which forms the core of the slab is deposited upon the sheet 12 at any suitable point. Rolls 25 and 62 function as previously described to rub or force some of the slurry uniformly into the core-contacting surfaces of the sheets so that when the cementitious material sets a thorough and tenacious bond will be present between the covers and the core. This bonding is undoubtedly due to the union of the crystals of cementitious material penetrated within the surface of the sheet, and the core material, which thus forms a unitary crystalline framework enmeshing the network of fibers adjacent the surface of the cover sheet. Where merely the rubbing of the slurry into the surface of the sheet may not cause a sufficient or deep enough penetration of the crystals by reason of the peculiarities of the covering material, the surface fibers of such material may be sufficiently roughened or the surface opened by running the same in contact with means such as the sanding rolls or wire brushes 66 and 68.

When the slurry forming the core comprises a percentage of fibrous material such as hair, wood fibers or the like, or where it is desired to rub a retarded slurry into the interface surface of the cover sheet or where for any other reason it may be desirable to operate upon the cover with a different slurry than the core slurry, then it may become desirable to provide means for operating upon the sheet apart from the slurry 70 (Fig. 5). To this end I preferably situate the roll 25 before the mixer 14, and the roll 62 at a point farther up on the periphery of the roll 16 and then provide suitable means for delivering slurry of the desired consistency and composition to the sheets 12 and 18, respectively, just before the rubbing rolls, whereby the same general bonding results are obtained as where the core slurry itself is rubbed into the cover sheets, as hereinbefore described. For this purpose I may provide a mixer 71 having a discharge gate 72 for regulating the amount of slurry deposited in either of the troughs 73 and 74. The material in trough 73 is dropped upon the sheet 12 just before this sheet is operated upon by the roll 25; and the material in trough 74 drops upon the sheet 18 just ahead of roll 62. Although placed so as to be out of direct contact with the slurry 70, the rolls 25 and 62 are nevertheless preferably placed sufficiently close to the point at which the sheets 12 and 18 embrace the slurry 70 so that the cementitious material which has been rubbed into the surface of these sheets will not set before the sheets embrace the core material.

The product formed in accordance with my process is characterized by a thorough union between the core and cover sheets, and all the benefits attendant upon this feature.

If desired, the rubbing rolls 25 and 62 may be omitted, and beneficial bonding results obtained by merely using the abrading rolls or brushes 66 or 68. Also the oscillation of the rolls 25 and 62 may be omitted, and simple rotation of said rolls may be employed. Cementitious materials other than gypsum may be used such as silicate compositions, cements, adhesives, etc.

I would state in conclusion that while the described methods and illustrated examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. In the manufacture of plasterboard, the method of improving the inter-surface bond between the core and a cover sheet, which comprises rapidly oscillating a roll in contact with the moving sheet in the presence of at least some of the core material, and rotating said roll in a direction opposite to the direction of movement of the sheet, whereby some of said core material is penetrated into the surface of the sheet so that said core will thoroughly grip the sheet after setting.

2. In the manufacture of plasterboard, the method of improving the bond between a cover sheet and the cementitious core, which comprises rapidly oscillating a driven roller in contact with the surface of the moving cover sheet in the presence of cementitious core material, and rotating said roll at a speed different from the speed of movement of the sheet to rub some of said material into the surface of the sheet so that there will be a thorough inter-surface bond between the core and cover sheet.

3. The method of effecting the bond between the cover sheets and core of plasterboard, which comprises oscillating a rotating roller over the surface of a cover sheet in the presence of the cementitious core material so as to rub some of said cementitious material into the surface of the sheet, whereby the core after setting will thoroughly grip said sheet.

4. In combination in apparatus of the class described, means for supporting a moving strip of sheet material, means for depositing a small quantity of plastic material upon the sheet, means for substantially scrubbing said plastic material into the surface of the sheet, and means for delivering a substantial quantity of plastic material onto said sheet after said scrubbing means has operated upon said sheet.

5. In combination in a plasterboard machine, forming means, means for delivering a pair of cover sheets, means for depositing plaster upon one of said cover sheets, means for rubbing the plaster into the surface of said one cover sheet, means for roughening the surface of the remaining cover sheet, and means adjacent the forming means for rubbing the plaster into the roughened surface of said last mentioned cover sheet.

6. In apparatus of the class described, a roll contacting with material passing thereunder, means adapted for driving said roll at a speed different from the speed of the material passing thereunder, means for oscillating said roll transversely of said material, means for exerting a constant pressure upon said roll, and means for promptly releasing the pressure exerted upon said roll.

7. In an apparatus for the manufacture of wallboard, means for depositing cementious material upon a moving cover sheet, and a driven oscillating roll in the path of said sheet and cementitious material and contacting the surface of said sheet, said roll rubbing some of said cementious material into the surface of said sheet.

8. In apparatus of the class described, means for roughening the surface of a travelling sheet, means for depositing crystalline material upon said sheet, and means for forcing the crystalline material into the roughened surface of said sheet.

9. The method of effecting a bond between a cover sheet and the plastic core of wallboard, which comprises driving a roller in contact with said sheet in a peripheral direction contrary to the direction of movement of the sheet, and in the presence of plastic core material, to rub the presence of plastic material into the surface of the sheet so that said core will thoroughly grip the sheet after setting.

10. The method of effecting a bond between a cover sheet and the plastic core of wallboard, which comprises driving a roller in contact with said sheet at a peripheral speed greater than the surface movement of the sheet and in the presence of plastic core material to rub some of said plastic material into the surface of the sheet so that said core will thoroughly grip the sheet after setting.

11. The method of effecting a bond between a cover sheet and the plastic core of wallboard, which comprises driving a roller in contact with said sheet with a peripheral movement different from the surface movement of the sheet, and in the presence of plastic core material, to rub some of said material into the surface of the sheet so that said core will thoroughly grip the sheet after setting.

12. In the manufacture of wallboard, the method of improving the bond between a cover sheet and the cementitious core, which comprises roughening the bonding surface of said sheet, rapidly oscillating a driven roller in contact with the surface of the moving cover sheet, in the presence of cementitious core material, and driving said roll at a speed different from the speed of movement of the sheet, to rub some of said material into the roughened surface of the sheet so that there will be a thorough inter-surface bond between the core and cover sheet.

13. In the manufacture of wallboard, the method of improving the inter-surface bond between the core and a cover sheet, which comprises roughening the bonding surface of said sheet, rapidly oscillating a roll in contact with the moving sheet in the presence of at least some of the core material, and driving said roll in a direction opposite to the direction of movement of the sheet, whereby some of said core material is penetrated into the roughened surface of the sheet so that said core will thoroughly grip the sheet after setting.

14. The method of increasing the bond between a moving strip of paper and a cementitious material, which comprises rotating a roll in contact with said strip, said roll having a peripheral movement different from the surface movement of said strip, said roll being in contact with a slurry of said cementitious material.

15. In apparatus for the manufacture of slabs having a cementitious core, the combination with means for delivering cover sheets, means for delivering cementitious material and means for forming said slabs, of means for roughening the core-contacting surfaces of the cover sheets, means for depositing small quantities of cementitious material onto the roughened surfaces of the cover sheets, and means for rubbing said small quantities of material into the fibers of the roughened surfaces to improve the bonding between said sheets and the core, all of said operating means being adapted for continuous operation during the continuous movement of the material.

16. In apparatus of the class described, a roll in contacting relationship with a moving sheet and the cementitious material carried by said sheet, means for driving said roll with a peripheral movement different from the surface movement of the sheet, and means for exerting pressure upon said roll, whereby said material is rubbed into the surface of said sheet.

17. In apparatus of the class described, a driven roll, means for resiliently pressing the roll in contact with material passing thereunder, and means for oscillating said roll to act upon said material.

18. In apparatus for the purpose defined, means for continuously delivering fibrous material, and means for mechanically and continuously forcing cementitious material into the surface of said fibrous material.

19. In apparatus of the class described, means for delivering material having a fibrous surface, means for depositing plastic material upon said fibrous surface, scrubbing means adapted to force said plastic material into said fibrous surface, and means for pressing said scrubbing means into intimate contact with said fibrous surface, all of said means being mechanically operated to act during the continuous movement of the material.

20. In apparatus of the class described, means for delivering material having a fibrous surface, means for depositing plastic material upon said fibrous surface, scrubbing means adapted to force said plastic material into said fibrous surface, means for pressing said scrubbing means into intimate contact with said fibrous surface, and means adapted to instantaneously render said pressing means ineffective and release said scrubbing means from contacting with the fibrous surface.

21. In apparatus of the class described, means for delivering a moving strip of fibrous material, a driven oscillating roll adapted to contact and operate upon the surface of said strip of material, and an idling roll below said oscillating roll and contacting the opposite surface of said strip of material, said last mentioned roll being adapted to prevent displacement of said strip of material from its path as said driven roll oscillates in contact with said strip.

22. In apparatus of the class described, means for continuously delivering a strip of fibrous material, means for disturbing the fibers on a surface of said material, means for associating plastic material with said disturbed surface, means for forcing some of said plastic material into said disturbed surface, and means for uniformly pressing a body of said plastic material against said treated surface, whereby after setting said body of plastic material will cohere with the plastic material which has been forced into said surface and thereby thoroughly bond with the fibrous material.

23. In apparatus of the class described, means for delivering a strip of fibrous material, an abrading roll driven in contact with a surface of said fibrous material to roughen said surface, and means for associating plastic materials with said roughened surface, whereby a thorough bond will be effected between said materials.

24. In apparatus of the class described, means for carrying a moving strip of fibrous material, means for delivering plastic material to said moving strip, driven means in the path of said moving strip and plastic material adapted to act upon the surface of said strip to force some of said plastic material into such surface, and means on each side of said moving strip adapted to prevent the plastic material from being displaced from said strip while the driven means is operating on said strip.

25. In apparatus for continuously uniting dissimilar materials, a forming table, a fibrous strip movable over said table, a body of plastic material carried on said strip, a master roll, a second fibrous strip carried over said master roll and being pressed into contact with said plastic material to enclose the same, and means adjacent the periphery of said master roll for substantially forcing plastic material into the surface of said second strip before such strip is pressed into contact with said body of plastic material, whereby said second strip and said body of plastic material will thoroughly bond.

26. In apparatus for continuously uniting dissimilar materials, a forming table, a fibrous strip movable over said table, a body of plastic material carried on said strip, a master roll, a second fibrous strip carried over said master roll and being pressed into contact with said plastic material to enclose the same, means for abrading the plastic-material-contacting surface of said second strip, and means adjacent the periphery of said master roll for substantially forcing plastic material into the abraded surface of said second strip before such strip is pressed into contact with said body of plastic material, whereby said second strip and said body of plastic material will thoroughly bond.

THOMAS P. CAMP.